US011386712B2

United States Patent
Yadav et al.

(10) Patent No.: US 11,386,712 B2
(45) Date of Patent: Jul. 12, 2022

(54) METHOD AND SYSTEM FOR MULTIMODAL ANALYSIS BASED EMOTION RECOGNITION

(71) Applicant: Wipro Limited, Bangalore (IN)

(72) Inventors: Rahul Yadav, Alwar (IN); Gopichand Agnihotram, Bangalore (IN)

(73) Assignee: Wipro Limited, Bangalore (IN)

( * ) Notice: Subject to any disclaimer, the term of this patent is extended or adjusted under 35 U.S.C. 154(b) by 337 days.

(21) Appl. No.: 16/795,840

(22) Filed: Feb. 20, 2020

(65) Prior Publication Data

US 2021/0201004 A1 Jul. 1, 2021

(30) Foreign Application Priority Data

Dec. 31, 2019 (IN) .............................. 201941054796

(51) Int. Cl.
| | |
|---|---|
| *G06K 9/00* | (2022.01) |
| *G06V 40/20* | (2022.01) |
| *G10L 25/63* | (2013.01) |
| *G10L 25/21* | (2013.01) |
| *G10L 15/22* | (2006.01) |
| *G10L 15/26* | (2006.01) |

(Continued)

(52) U.S. Cl.
CPC ............ *G06V 40/20* (2022.01); *G06V 20/46* (2022.01); *G06V 40/174* (2022.01); *G10L 15/22* (2013.01); *G10L 15/26* (2013.01); *G10L 25/21* (2013.01); *G10L 25/63* (2013.01)

(58) Field of Classification Search
CPC ...... G06V 40/20; G06V 20/46; G06V 40/174; G10L 15/22; G10L 15/26; G10L 25/21; G10L 25/63; G06K 9/6247; G06F 40/30
See application file for complete search history.

(56) References Cited

U.S. PATENT DOCUMENTS 8,979,546 B2 3/2015 Duffy
2005/0228236 A1 10/2005 Diederich et al.
(Continued)

FOREIGN PATENT DOCUMENTS

WO 2018132483 A1 7/2018
WO 2019162054 A1 8/2019

*Primary Examiner* — Solomon G Bezuayehu
(74) *Attorney, Agent, or Firm* — Finnegan, Henderson, Farabow, Garrett & Dunner, LLP (57) ABSTRACT

The present invention discloses method and system for multimodal analysis based emotion recognition. The method comprising segmenting video data of a user into a plurality of video segments. A plurality of visual features, voice features and text features from the plurality of video segments is extracted. Autocorrelation values among each of the plurality of visual features, the voice features, and the text features is determined. Each of the plurality of visual features, the voice features and the text features is aligned based on video segment identifier and the autocorrelation values to obtain a plurality of aligned multimodal features. One of two classes of emotions is determined for each of the plurality of aligned multimodal features. The determined emotion for each of the plurality of aligned multimodal features is compared with historic multimodal features from a database, and emotion of the user is determined at real time based on comparison.

20 Claims, 5 Drawing Sheets

(51) Int. Cl.
*G06V 20/40* (2022.01)
*G06V 40/16* (2022.01)

(56) References Cited

U.S. PATENT DOCUMENTS

| | | | |
|---|---|---|---|
| 2011/0307257 A1* | 12/2011 | Pereg | G06Q 10/063 |
| | | | 704/E15.005 |
| 2012/0093370 A1* | 4/2012 | Ding | G06K 9/6215 |
| | | | 382/106 |
| 2016/0262680 A1 | 9/2016 | Martucci et al. | |
| 2018/0285641 A1* | 10/2018 | Yan | G10L 25/63 |
| 2019/0266406 A1* | 8/2019 | Tang | G06F 16/51 |
| 2021/0151034 A1* | 5/2021 | Hasan | G06V 40/174 |
| 2021/0185276 A1* | 6/2021 | Peters | G06V 20/41 |
| 2021/0191506 A1* | 6/2021 | Wang | G06N 5/02 |

\* cited by examiner

METHOD AND SYSTEM FOR MULTIMODAL ANALYSIS BASED EMOTION RECOGNITION

TECHNICAL FIELD

The present subject matter is generally related to emotion recognition, more particularly, but not exclusively, to a method and a system for real time multimodal analysis based emotion recognition.

BACKGROUND

Emotion recognition involves detection of human emotion. With the advancement in technology, human emotions are studied to identify emotion recognition symptoms demonstrated in most neuropsychiatric disorders like bipolar affective disorder and body dysmorphic disorder. It is related as trait marker for schizophrenia and has been demonstrated in various neurological disorders. Similar deficits in negative emotions of anger and disgust are seen in Huntington's disease. Significant efforts have been made in past for emotion recognition and analysing different emotions. Earlier most of the detection work was based on single model using either visual, speech or text. Each of these models performed well in one scenario but failed in other scenarios. For example, emotion recognition model on images worked well if facial features were clearly visible but failed when a targeted person tilts his/her face a little or if the lighting conditions become poor. Considering limitations related to each of the visual, speech or text model, the detection work lead to combination of the inputs from these 3 models to form a fused model. Insofar, the fused model is not efficient in detecting Facial Emotion Recognition Deficits (FERD) and at the same time, it is time consuming.

The information disclosed in this background of the disclosure section is for enhancement of understanding of the general background of the invention and should not be taken as an acknowledgement or any form of suggestion that this information forms the prior art already known to a person skilled in the art.

SUMMARY

In an embodiment, the present disclosure may relate to a method for real time multimodal analysis for emotion recognition. The method includes segmenting video data of a user into a plurality of video segments, wherein each of the plurality of video segments are identified by a video segment identifier. In the next step, a plurality of visual features, a plurality of voice features and a plurality of text features are extracted from the plurality of video segments. The plurality of visual features, the plurality of voice features, and the plurality of text features are identified by the corresponding video segment identifier. The text features are extracted from voice data in the video data of a user. Further, autocorrelation values among each of the plurality of visual features, the plurality of voice features, and the plurality of text features is determined. In the following step, each of the plurality of visual features, the plurality of voice features and the plurality of text features is aligned based on the video segment identifier and the autocorrelation values to obtain a plurality of aligned multimodal features. One of two classes of emotions for each of the plurality of aligned multimodal features is determined based on correlation values determined for each of the plurality of aligned multimodal features. The two classes of emotions comprise positive class of emotions, and negative class of emotions. Lastly, the determined emotion for each of the plurality of aligned multimodal features is compared with historic multimodal features from a database and emotion of the user is determined at real time based on comparison.

In an embodiment, the present disclosure may relate to a real time multimodal assisting system for multimodal analysis for emotion recognition. The multimodal assisting system may include a processor and a memory communicatively coupled to the processor, wherein the memory stores processor-executable instructions, which on execution, cause the processor to segment video data of a user into a plurality of video segments. Each of the plurality of video segments are identified by a video segment identifier. In the next step, the processor extracts a plurality of visual features, a plurality of voice features and a plurality of text features from the plurality of video segments. The plurality of visual features, the plurality of voice features, and the plurality of text features are identified by the corresponding video segment identifier. The text features are extracted from voice data in the video data of a user. The processor determines autocorrelation values among each of the plurality of visual features, the plurality of voice features, and the plurality of text features. In the following step, the processor aligns each of the plurality of visual features, the plurality of voice features and the plurality of text features based on the video segment identifier and the autocorrelation values to obtain a plurality of aligned multimodal features. In the next step, the processor determines one of two classes of emotions for each of the plurality of aligned multimodal features based on correlation values determined for each of the plurality of aligned multimodal features. The two classes of emotions comprise positive class of emotions, and negative class of emotions. Lastly, the processor compares the determined emotion for each of the plurality of aligned multimodal features with historic multimodal features from a database, and determines emotion of the user at real time based on comparison.

In an embodiment, the present disclosure may relate to a non-transitory computer readable medium including instructions stored thereon that when processed by at least one processor cause a multimodal assisting system to perform operations comprising segmenting video data of a user into a plurality of video segments, wherein each of the plurality of video segments are identified by a video segment identifier. In the next step, a plurality of visual features, a plurality of voice features and a plurality of text features is extracted from the plurality of video segments. The plurality of visual features, the plurality of voice features, and the plurality of text features are identified by the corresponding video segment identifier. The text features are extracted from voice data in the video data of a user. Autocorrelation values among each of the plurality of visual features, the plurality of voice features, and the plurality of text features is determined. In the following step, each of the plurality of visual features, the plurality of voice features and the plurality of text features is aligned based on the video segment identifier and the autocorrelation values to obtain a plurality of aligned multimodal features. One of two classes of emotions for each of the plurality of aligned multimodal features is determined based on correlation values determined for each of the plurality of aligned multimodal features. The two classes of emotions comprise positive class of emotions, and negative class of emotions. Lastly, the determined emotion for each of the plurality of aligned multimodal features is compared with historic multimodal features from a database and emotion of the user is determined at real time based on comparison.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described below, by way of example only, and with reference to the accompanying figures.

It should be appreciated by those skilled in the art that any block diagrams herein represent conceptual views of illustrative systems embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure provide a solution for real time multimodal analysis for emotion recognition. The embodiments of the present disclosure consider multimodal information to train on emotional data for determining different emotions of users. The multimodal information may come from different sources of data such as voice, visual, and text. This multimodal information is fused to derive emotional events of the different users, which may help to identify whether users are suffering from FERD or not. The present disclosure, also, helps the users to overcome this deficit. The present disclosure uses multimodal inputs-based emotion recognition followed by emotion analysis for FERD and real time multimodal emotion determination using early fusion.

Figure 1:
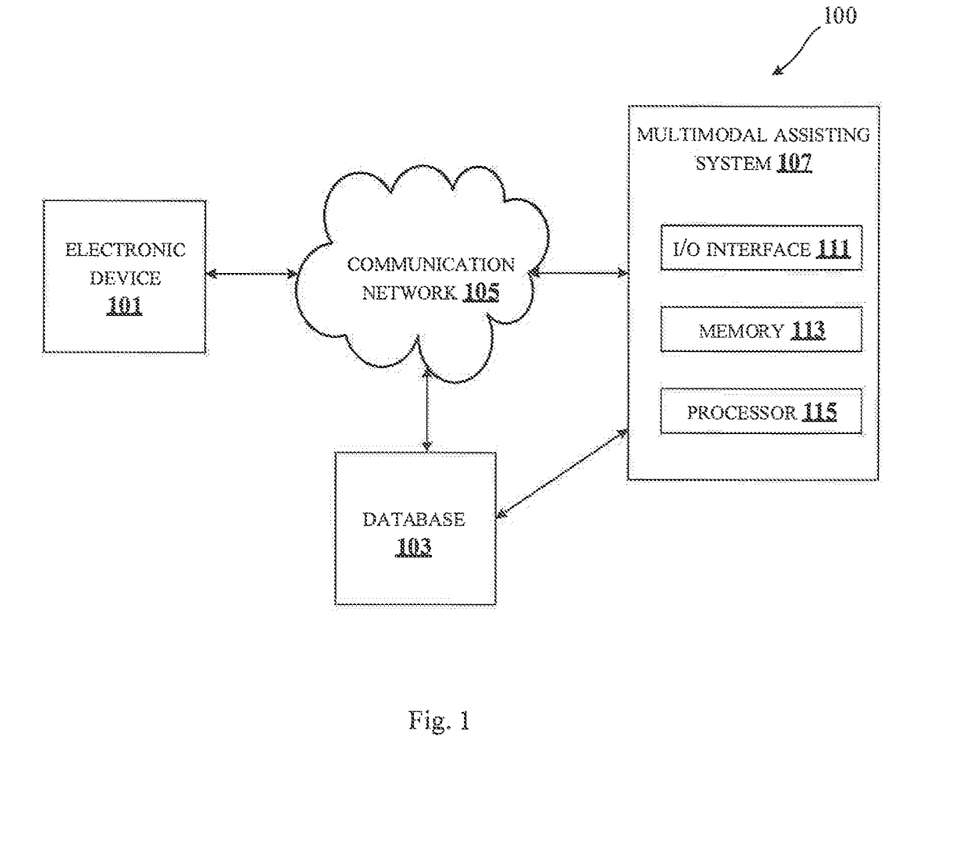
FIG. 1 illustrates an exemplary environment for real time multimodal analysis for emotion recognition in accordance with some embodiments of the present disclosure.

FIG. 1 illustrates an exemplary environment for real time multimodal analysis for emotion recognition in accordance with some embodiments of the present disclosure.

As shown in the FIG. 1, the environment 100 includes an electronic device 101, a database 103, a communication network 105 and a multimodal assisting system 107. The electronic device 101 may be connected through the communication network 105 to the multimodal assisting system 107. In an embodiment, the electronic device 101 may include, but is not limited to, a mobile terminal, a tablet computer or a camera. A person skilled in the art would understand that, any electronic devices with a camera feature, not mentioned explicitly, may also be used as the electronic device 101 in the present disclosure. The electronic device 101 may capture and provide video data of a user to the multimodal assisting system 107 via the communication network 105 and may receive emotion recognition as an output from the multimodal assisting system 107 via the communication network 105. The real time video data may be a real time video of user responses during an interaction with a doctor. The video data may include at least one of visual features, voice features and text features. The electronic device 101 may capture the video data. The communication network 105 may include, but is not limited to, a direct interconnection, an e-commerce network, a Peer-to-Peer (P2P) network, Local Area Network (LAN), Wide Area Network (WAN), wireless network (for example, using Wireless Application Protocol), Internet, Wi-Fi, Bluetooth and the like.

In the embodiment, the multimodal assisting system 107 may perform multimodal analysis for emotion recognition using the video data of the user. The multimodal assisting system 107 may include an I/O interface 111, a memory 113 and a processor 115. The I/O interface 111 may be configured to receive the video data from the electronic device 101. Analogously, the I/O interface 111 may be configured to communicate with the electronic device 101 to provide recognized emotion of the user as an output. The I/O interface 111 may employ communication protocols/methods such as, without limitation, audio, analog, digital, monoaural, Radio Corporation of America (RCA) connector, stereo, IEEE-1394 high speed serial bus, serial bus, Universal Serial Bus (USB), infrared, Personal System/2 (PS/2) port, Bayonet Neill-Concelman (BNC) connector, coaxial, component, composite, Digital Visual Interface (DVI), High-Definition Multimedia Interface (HDMI), Radio Frequency (RF) antennas, S-Video, Video Graphics Array (VGA), IEEE 802.11b/g/n/x, Bluetooth, cellular e.g., Code-Division Multiple Access (CDMA), High-Speed Packet Access (HSPA+), Global System for Mobile communications (GSM), Long-Term Evolution (LTE), Worldwide interoperability for Microwave access (WiMax), or the like.

The video data received by the I/O interface 111 from the electronic device 101 may be stored in the memory 113. The memory 113 may be communicatively coupled to the processor 115 of the multimodal assisting system 107. The memory 113 may, also, store processor instructions which may cause the processor 115 to execute the instructions for real time multimodal analysis for emotion recognition. The memory 113 may include, without limitation, memory drives, removable disc drives, etc. The memory drives may further include a drum, magnetic disc drive, magneto-optical drive, optical drive, Redundant Array of Independent Discs (RAID), solid-state memory devices, solid-state drives, etc.

The processor 115 may include at least one data processor for real time multimodal analysis for emotion recognition. The processor 115 may include specialized processing units such as integrated system (bus) controllers, memory management control units, floating point units, graphics processing units, digital signal processing units, etc.

In the embodiment, the multimodal assisting system 107 may exchange data with a database 103 directly or through the communication network 105. The database 103 may be populated or stored with historic data. Here, the historic data may refer to data received from one or more electronic devices 101 by the multimodal assisting system 107 during training phase. The historic data may include at least one of a plurality of historic video segments, a plurality of historic visual features, a plurality of historic voice features and a plurality of historic text features. Each of the plurality of historic video segments may be identified by a historic video segment identifier. The plurality of historic visual features and the plurality of historic voice features may be extracted from the plurality of historic video segments and identified using the historic video segment identifier. The plurality of historic text features may be extracted from voice data in the historic video data. Following which autocorrelation values among each of the plurality of historic visual features, the plurality of historic voice features, and the plurality of historic text features may be determined. Subsequently, a plurality of historic aligned multimodal features may be obtained by aligning each of the plurality of historic visual features, the plurality of historic voice features and the plurality of historic text features based on the historic video segment identifier and the autocorrelation values. Lastly, one of two classes of emotions (i.e. positive class of emotions and negative class of emotions) for each of the plurality of historic aligned multimodal features may be determined based on correlation values. To determine the class of emotions, any Deep Neural Network (DNN) may be used. A Long short-term memory (LSTM) network, a Convolutional Neural Network (CNN or ConvNet) or Bidirectional LSTM (Bi-LSTM) network may be used. However, Bi-LSTM network has a better performance as compared to the LSTM network and the CNN when dealing with dynamic datasets as in the present case. The final layer of the neural network may be a SoftMax classifier that classifies outputs into 10 classes corresponding to 10 basic emotion (happy, interest, excitement, love and contentment under positive class of emotions, and sad, anger, fear, disgust and contempt under negative class of emotions) that are detected. Finally, the best model from the training may be selected and its weights may be used as pre-training for training historic dataset. This trained model may be further used to recognize user's emotion in real time. The emotions recognized for each of the plurality of historic aligned multimodal features may be stored in the database 103 for comparing with user emotions determined at real time. For instance, if $vod_i=(vod_{i1}, vod_{i2}, \ldots, vod_{in})$ represents a plurality of historic visual features for the $i^{th}$ video segment in the interval $[t_i, t_i+1]$, $voc_i=(voc_{i1}, voc_{i2}, \ldots, voc_{in})$ represents a plurality of historic voice features for the $i^{th}$ video segment in the interval $[t_i, t_i+1]$ and $Txt_i=(Txt_{i1}, Txt_{i2}, \ldots, Txt_{in})$ represents a plurality of historic text features for the $i^{th}$ video segment in the interval $[t_i, t_i+1]$, then for each i in $[t_i, t_i+1][(vod_{i1}, vod_{i2}, \ldots, vod_{in}), (voc_{i1}, voc_{i2}, \ldots, voc_{in}), (Txt_{i1}, Txt_{i2}, \ldots, Txt_{in})$, $label_i$ may be referred as fused multimodal features and used along with labels.

The database 103 may, also, be updated at pre-defined intervals of time. These updates may be related to at least one of the plurality of historic video segments, the plurality of historic visual features, the plurality of historic voice features and the plurality of historic text features and corresponding emotions for adaptive learning purpose. For example, using the previously trained weights as the base, the above-mentioned neural network or model may be trained further using case-specific collected dataset to further enhance the accuracy of the model. These datasets may include videos recorded from different users who are not having neuro-psychological disorder and FERD symptoms with different categories such as male child, female child, male adult, female adult, older male, older female, etc and performing the 10 basic human emotions such as happy, interest, excitement, love, sad, angry, fear, disgust, and contempt in 3 different intensities (low, medium and high). These datasets may be processed in a similar way as described earlier and then may be passed for training using the previously trained weights as initials. The specific trained model may be used for testing users to identify whether the user has FERD symptoms.

Figure 2:
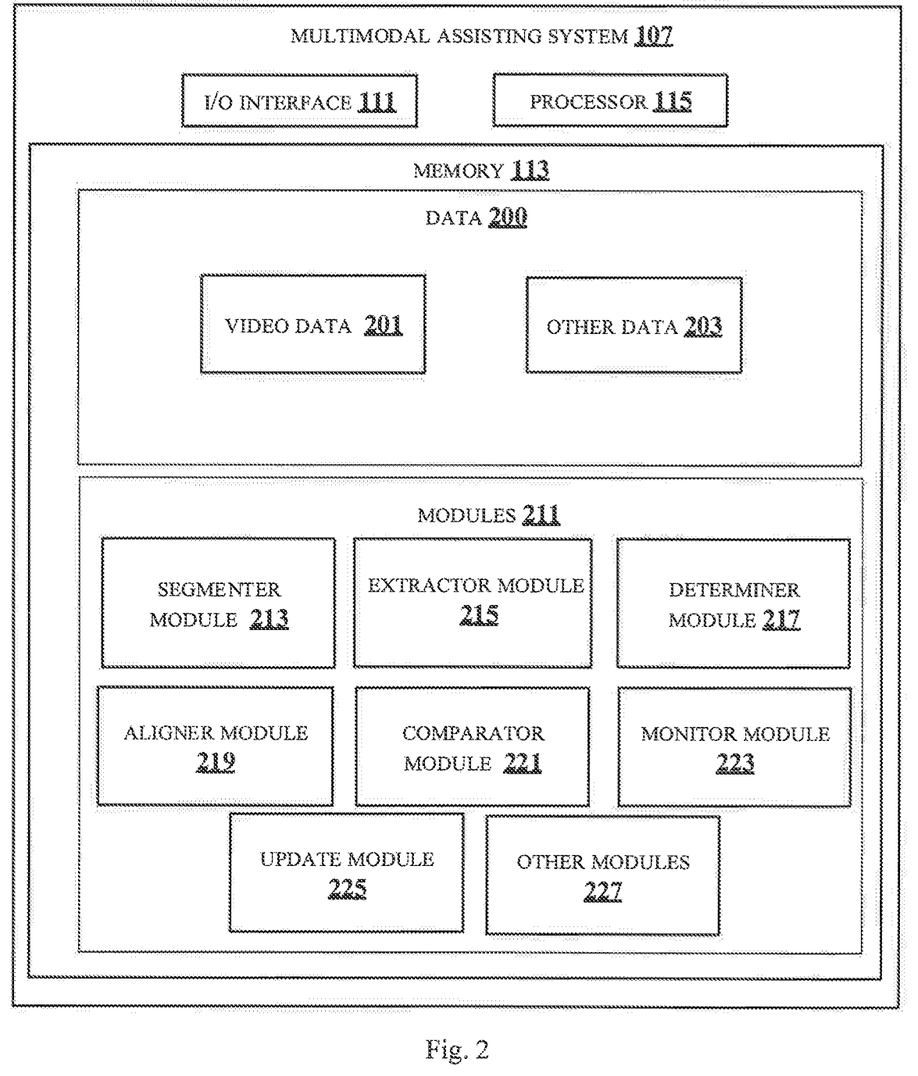
FIG. 2 shows a detailed block diagram of a multimodal assisting system in accordance with some embodiments of the present disclosure.

FIG. 2 shows a detailed block diagram of a multimodal assisting system in accordance with some embodiments of the present disclosure.

The multimodal assisting system 107, in addition to the I/O interface 111 and processor 115 described above, may include data 200 and one or more modules 211, which are described herein in detail. In the embodiment, the data 200 may be stored within the memory 113. The data 200 may include, for example, video data 201 and other data 203.

The video data 201 may include video data of a user captured at real time. The video data may comprise at least one of visual, voice and text data. The I/O interface 111 of the multimodal assisting system 107 may receive the video data of the user at real time, which is stored in the video data 201.

The other data 203 may store data, including temporary data and temporary files, generated by modules 211 for performing the various functions of the multimodal assisting system 107.

In the embodiment, the data 200 in the memory 113 are processed by the one or more modules 211 present within the memory 113 of the multimodal assisting system 107. In the embodiment, the one or more modules 211 may be implemented as dedicated hardware units. As used herein, the term module refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality. In some implementations, the one or more modules 211 may be communicatively coupled to the processor 115 for performing one or more functions of the multimodal assisting system 107. The said modules 211 when configured with the functionality defined in the present disclosure will result in a novel hardware.

In one implementation, the one or more modules 211 may include, but are not limited to, a segmenter module 213, an extractor module 215, a determiner module 217, an aligner module 219, a comparator module 221, a monitor module 223 and an update module 225. The one or more modules 211 may, also, include other modules 227 to perform various miscellaneous functionalities of the multimodal assisting system 107.

Here, the segmenter module 213, the extractor module 215, the determiner module 217, the aligner module 219 and the update module 225 may be used in a training phase. During the training phase, the database 103 may be populated or stored with at least one of the plurality of historic video segments, the plurality of historic visual features, the plurality of historic voice features and the plurality of historic text features and corresponding emotions. The historic data may refer to data received during the training phase.

The segmenter module 213 may receive video data of a user at real time from the electronic device 101 via the communication network and the I/O interface 111. Subsequently, the segmenter module 213 may segment the video data of the user into a plurality of video segments. Each of the plurality of video segments may be identified by a video segment identifier. The video data may, also, be referred as multimodal input or multichannel data as it contains visual data, voice data and text data.

The extractor module 215 may extract a plurality of visual features, a plurality of voice features and a plurality of text features from the plurality of video segments. The plurality of visual features, the plurality of voice features, and the plurality of text features may be identified by the corresponding video segment identifier. The text features may be extracted from voice data in the video data of the user. The extractor module 215 may, also, be referred as multimodal features extraction module. The extractor module 215 may extract the plurality of visual features from the plurality of video segments. For extraction of visual features, the extractor module may use OpenFace library. The visual features may comprise at least one of facial landmarks and pixel values used to obtain head pose estimation, facial action units and eye-gaze estimation. The extractor module 215 may extract the plurality of voice features from the plurality of the video segments. For extraction of voice features, the extractor module may use openSMILE library. The voice features may comprise at least one of frame energy, frame intensity/loudness, critical band spectra, Perceptual Linear Predictive (PLP) coefficients, Linear Predictive Coefficients (LPC) and Line Spectral Pairs. The extractor module 215 may extract the plurality of text features from voice data in the video data of the user. For extraction of text features, the extractor module may use KALDI speech recognition technology to convert voice data to text data. The text data may then be converted into vectors by pre-trained word embedding to be used as text features. The extracted features i.e. the plurality of visual features, the plurality of voice features and the plurality of text features may be stored into a file in the database 103 or as a computational sequence. The extraction process may happen sequential or in parallel.

The determiner module 217 may determine autocorrelation values among each of the plurality of visual features, the plurality of voice features and the plurality of text features. In order to leverage the power of combining visual, voice and text features, a uniform convention or a reference point may be used over which each modality i.e. visual, voice and text is aligned to help capture their respective features together. Here, one of the modalities may be used as a reference modality with which other modalities are aligned. With respect to the reference modality (for example, text), the exact time frames of occurrence of the same event among all other modalities (for example, visual and voice) are matched as accurately as possible.

The aligner module 219 may align each of the plurality of visual features, the plurality of voice features and the plurality of text features based on the video segment identifier and the autocorrelation values obtained from the determiner module 217. The aligner module 219 may produce a plurality of aligned multimodal features. Alignment process avoids any mismatch between 3 different modalities (i.e. visual feature, voice feature and textual feature) as 3 different modalities may have 3 different temporal frequencies. Following the aligning process, the aligner module 219 may reduce size of the plurality of aligned multimodal features using a Principal Component Analysis (PCA) technique. A skilled person may use any other technique as well that is relevant to reduce the size of the plurality of aligned multimodal features. The process of reducing the size of the plurality of aligned multimodal features may be explained below with an example. The PCA technique may be performed for a defined interval of different modality (i.e. textual feature here). This step may reduce the size of the textual feature vector by considering only the important features (for example, selecting top 128 performing feature here). Now, the high dimensional textual feature vector (1024×1) is reduced to lower dimension (128×1). This step speeds up the testing of emotions part, which is done by the comparator module 221. Using the reduced textual feature vector, voice features are aligned to get first vector v1 following which another feature vector v2 is obtained by aligning visual features and textual feature vectors. For example, the textual feature vector having size 128×1 and the visual feature having a size 72×1 are aligned to form vector v1 of 128×1 dimension. Similarly, vector v2 of 128×1 is obtained by aligning 14×1 dimensional voice feature vector with 128×1 dimensional textual feature vector. Now v1 and v2 are combined to form the final input vector v3. The vector v3 has fused feature from all 3 modalities i.e. visual, voice and text and has a dimension of 128×1.

The determiner module 217 may determine one of two classes of emotions for each of the plurality of aligned multimodal features based on correlation values determined for each of the plurality of aligned multimodal features. The two classes of emotions may comprise positive class of emotions, and negative class of emotions. Positive class of emotions are emotions that are typically found pleasurable to experience. These include happiness, joy, interest, curiosity, excitement, gratitude, love, and contentment. Here, HAPPY, INTEREST, EXCITEMENT, LOVE, and CONTENTMENT are broadly used to classify positive class of emotions. Negative class of emotions are described as any feeling which causes to become miserable and sad. These include sadness, anger, loneliness, jealousy, self-criticism, fear, or rejection. Here, SAD, ANGER, FEAR, DISGUST, and CONTEMPT are broadly used to classify negative class of emotions. The determiner module 217 may use the plurality of aligned multimodal features obtained from the aligner module 219 to compute correlation values of all the features in each of video segment. These correlation values along with the aligned multimodal features are used to determine emotional values or class of emotion in each of the video segment. This emotion determination may happen in real time and aligned multimodal features may be used by the trained DNN model to determine emotion on each 10-sec interval or predefined interval of the video data.

The comparator module 221 may compare the determined emotion for each of the plurality of aligned multimodal features with historic multimodal features from the database 103. The output of comparator module 221 may be a confusion matrix summarized into 2 main classes "Positive" and "Negative" emotions as given in the below table 1.

TABLE 1

|  | Class 1: Determined (Positive Emotion) | Class 2: Determined (Negative Emotion) |
| --- | --- | --- |
| Class 1 Historic | TP (True Positive) | FN (False Negative) |
| Class 2 Historic | FP (False Positive) | TN (True Negative) |

From the table 1, Recall and Precision parameters may be calculated.

The determiner module 217 may determine emotion of the user at real time based on comparison. The determiner module 217 may use the confusion matrix obtained from the comparator module 221 to calculate Recall and Precision parameters. These parameters are described below:

Recall parameter may be defined as the ratio of the total number of correctly classified positive examples divide to the total positive examples. High Recall indicates the probability that user might not be suffering with neuro-psychological disorder or FERD symptoms. The Recall parameter may be given as Recall=TP/(TP+FN).

Precision parameter may be defined as the ratio of total number of correctly classified positive examples divide to the total number of determined positive examples. High Precision indicates an example labelled as positive is only determined positive in most of the cases. If the precision is high, then it is probable that user might not be suffering with neuro-psychological disorder or FERD symptoms. The Precision parameter may be given as Precision=TP/(TP+FP).

The Precision and Recall parameter/values may be compared with predefined threshold values. Low Precision and low Recall values may indicate probability of the user may be suffering with neuro-psychological disorder or FERD symptoms.

The monitor module 223 may monitor the emotion of the user at real time for analysing the determined emotion of the user. The multimodal assisting system 107 may be provided to the user which he/she may use for regular monitoring or tracking of their progress of wrongly interpreting the emotions alongside the treatment prescribed by a doctor. This way the user may be updated on the effects of treatment on his/her condition and may be able to focus on the areas where the emotion recognitions are coming wrong. The multimodal assisting system 107 may, also, be provided to the user's doctor to monitor the user's condition including how the user is reacting to the prescribed medicine and if change of medicine can bring any improvements, etc. The multimodal assisting system 107 may provide a detailed report after the test including successful areas of emotion recognition as well as unsuccessful areas of emotion recognition. For example, "These are the emotions where the prediction is not up to the mark and you have to follow the doctor's suggestion to overcome this". Accordingly, the user may set the multimodal assisting system 107 to provide more contents related to those specific areas of improvements.

The update module 225 may update the historic multimodal features in the database 103 based on the analysis performed by the monitor module 223.

Figure 3A:
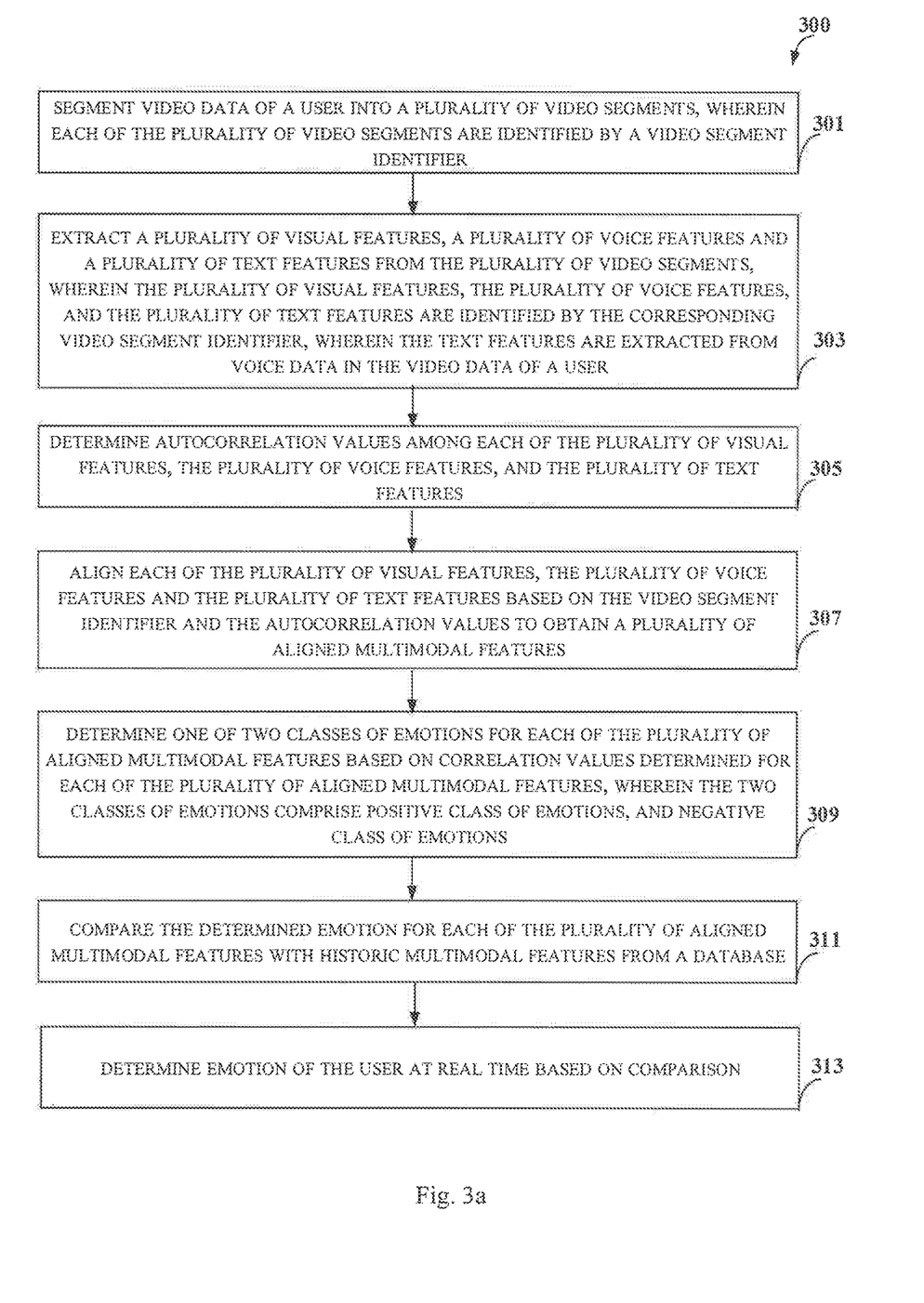
FIG. 3a-FIG. 3b illustrate flowcharts showing a method for real time multimodal analysis for emotion recognition in accordance with some embodiments of present disclosure.
Figure 3B:
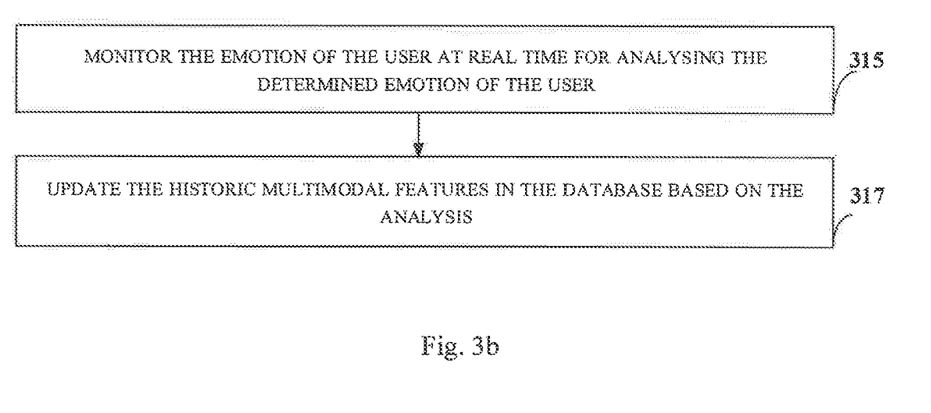

FIG. 3a-FIG. 3b illustrate flowcharts showing a method for real time multimodal analysis for emotion recognition in accordance with some embodiments of present disclosure.

As illustrated in FIG. 3a-FIG. 3b, the method 300 includes one or more blocks for real time multimodal analysis for emotion recognition. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, the segmenter module 213 may receive video data of a user. Subsequently, the segmenter module 213 may segment the video data of the user into a plurality of video segments. Each of the plurality of video segments are identified by a video segment identifier.

At block 303, the extraction module 215 may extract a plurality of visual features, a plurality of voice features and a plurality of text features from the plurality of video segments received from the segmenter module 213. The plurality of visual features, the plurality of voice features and the plurality of text features are identified by the corresponding video segment identifier. The text features are extracted from voice data in the video data of the user. The visual features may comprise at least one of facial landmarks and pixel values used to obtain head pose estimation, facial action units and eye-gaze estimation. The voice features may comprise at least one of frame energy, frame intensity/loudness, critical band spectra, Perceptual Linear Predictive (PLP) coefficients, Linear Predictive Coefficients (LPC) and Line Spectral Pairs.

At block 305, the determiner module 217 may determine autocorrelation values among each of the plurality of visual features, the plurality of voice features, and the plurality of text features received from the extraction module 215.

At block 307, the aligner module 219 may align each of the plurality of visual features, the plurality of voice features and the plurality of text features based on the video segment identifier and the autocorrelation values to obtain a plurality of aligned multimodal features. Further, the aligner module 219 may reduce size of the plurality of aligned multimodal features using a Principal Component Analysis (PCA) technique. A person skilled in the art may apply any relevant technique to reduce the size of the plurality of aligned multimodal features.

For example, for current time t, if visual features, voice features and text features are extracted in the interval of $[t_j, t_j+1]$ for the $j^{th}$ video segment, then for all j=1, 2, 3 ... n, multimodal features associated with each of the video segment is provided as $$((vod_{j1t}, vod_{j2t}, \ldots, vod_{jnt}), (voc_{j1t}, voc_{j2t}, \ldots, voc_{jnt}), (Txt_{j1t}, Txt_{j2t}, \ldots, Txt_{jnt}))$$

These above-mentioned multimodal features may be for training to compute emotions of patients.

At block 309, the determiner module 217 may determine one of two classes of emotions for each of the plurality of aligned multimodal features based on correlation values determined for each of the plurality of aligned multimodal features. The two classes of emotions may comprise positive class of emotions and negative class of emotions. Further, the positive class of emotions may comprise of happy, interest, excitement, love and contentment and the negative class of emotions may comprise of sad, anger, fear, disgust and contempt.

At block 311, the comparator module 221 may compare the determined emotion received from the determiner module 217 for each of the plurality of aligned multimodal features with historic multimodal features from the database 103.

At block 313, the determiner module 217 may determine emotion of the user at real time based on comparison performed at the block 311. Further, the determiner module 217 may detect at least one of neuro-psychological disorder and FERD symptoms in the user.

At block 315, the monitor module 223 may monitor the emotion of the user at real time for analysing the determined emotion of the user received from the block 313.

At block 317, the update module 225 may update the historic multimodal features in the database 103 based on the analysis performed at the block 315.

Some of the advantages of the present disclosure are listed below.

The present disclosure uses multimodal dataset to present solution making it more accurate and more usable in real world as compared to single modal dataset. Furthermore, the accuracy of the present method is improved through early fusion and training.

The present disclosure determines user emotion at real time, thereby, reducing long processing time.

The present disclosure, in addition to detection of user emotion, provides constant support and monitoring system.

The present disclosure allows detection of at least one of neuro-psychological disorder and facial emotion recognition deficits (FERD) symptoms in the user.

Computing System

Figure 4:
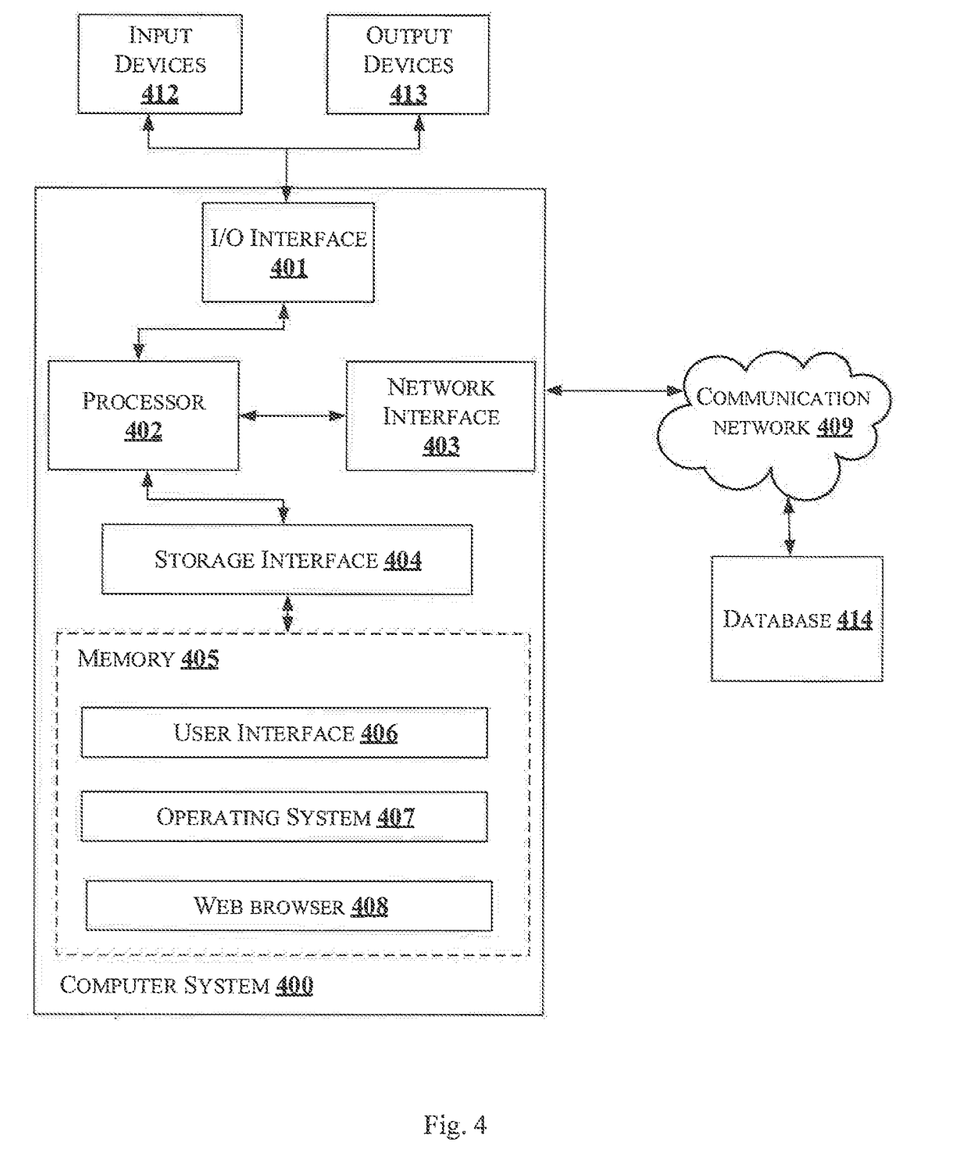
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 may be used to implement the multimodal assistant system 107. The computer system 400 may include a central processing unit ("CPU" or "processor") 402. The processor 402 may include at least one data processor for real time multimodal analysis for emotion recognition. The processor 402 may include specialized processing units such as, integrated system (bus) controllers, memory management control units, floating point units, graphics processing units, digital signal processing units, etc.

The processor 402 may be disposed in communication with one or more input/output (I/O) devices (not shown) via I/O interface 401. The I/O interface 401 employ communication protocols/methods such as, without limitation, audio, analog, digital, monoaural, Radio Corporation of America (RCA) connector, stereo, IEEE-1394 high speed serial bus, serial bus, Universal Serial Bus (USB), infrared, Personal System/2 (PS/2) port, Bayonet Neill-Concelman (BNC) connector, coaxial, component, composite, Digital Visual Interface (DVI), High-Definition Multimedia Interface (HDMI), Radio Frequency (RF) antennas, S-Video, Video Graphics Array (VGA), IEEE 802.11b/g/n/x, Bluetooth, cellular e.g., Code-Division Multiple Access (CDMA), High-Speed Packet Access (HSPA+), Global System for Mobile communications (GSM), Long-Term Evolution (LTE), Worldwide interoperability for Microwave access (WiMax), or the like, etc.

Using the I/O interface 401, the computer system 400 may communicate with one or more I/O devices such as input devices 412 and output devices 413. For example, the input devices 412 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 413 may be a printer, fax machine, video display (e.g., Cathode Ray Tube (CRT), Liquid Crystal Display (LCD), Light-Emitting Diode (LED), plasma, Plasma Display Panel (PDP), Organic Light-Emitting Diode display (OLED) or the like), audio speaker, etc.

In some embodiments, the computer system 400 consists of the multimodal assisting system 107. The processor 402 may be disposed in communication with the communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. The communication network 409 may include, without limitation, a direct interconnection, Local Area Network (LAN), Wide Area Network (WAN), wireless network (e.g., using Wireless Application Protocol), the Internet, etc. Using the network interface 403 and the communication network 409, the computer system 400 may communicate with a database 414. The network interface 403 may employ connection protocols include, but not limited to, direct connect, Ethernet (e.g., twisted pair 10/100/1000 Base T), Transmission Control Protocol/Internet Protocol (TCP/IP), token ring, IEEE 802.11a/b/g/n/x, etc.

The communication network 409 includes, but is not limited to, a direct interconnection, a Peer to Peer (P2P) network, Local Area Network (LAN), Wide Area Network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as, Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface 406, an operating system 407, etc. In some embodiments, computer system 400 may store user/application data, such as, the data, variables, records, etc., as described in this disclosure. Such databases may be implemented as fault-tolerant, relational, scalable, secure databases such as Oracle or Sybase.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS®, GOOGLE™ ANDROID™, BLACKBERRY® OS, or the like.

In some embodiments, the computer system 400 may implement web browser 408 stored program components. Web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. The computer system 400 may implement a mail server (not shown in FIG. 4) stored program component. The mail server may be an Internet mail server such as Microsoft Exchange, or the like. The mail server may utilize facilities such as ASP, ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. The computer system 400 may implement a mail client (not shown in FIG. 4) stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 3a and 3b show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference number | Description |
| --- | --- |
| 100 | Environment |
| 101 | Electronic device |
| 103 | Database |
| 105 | Communication network |
| 107 | Multimodal assisting system |
| 111 | I/O interface |
| 113 | Memory |
| 115 | Processor |
| 200 | Data |
| 201 | Video data |
| 203 | Other data |
| 211 | Modules |
| 213 | Segmenter module |
| 215 | Extractor module |
| 217 | Determiner module |
| 219 | Aligner module |
| 221 | Comparator module |
| 223 | Monitor module |
| 225 | Update module |
| 227 | Other modules |
| 400 | Computer system |
| 401 | I/O interface |
| 402 | Processor |
| 403 | Network interface |
| 404 | Storage interface |
| 405 | Memory |
| 406 | User interface |
| 407 | Operating system |
| 408 | Web browser |
| 409 | Communication network |
| 412 | Input devices |
| 413 | Output devices |
| 414 | Database |

What is claimed is:

1. A method for real time multimodal analysis for emotion recognition, the method comprising:
    segmenting, by a multimodal assisting system, video data of a user into a plurality of video segments, wherein each of the plurality of video segments are identified by a video segment identifier;
    extracting, by the multimodal assisting system, a plurality of visual features, a plurality of voice features and a plurality of text features from the plurality of video segments, wherein the plurality of visual features, the plurality of voice features, and the plurality of text features are identified by the corresponding video segment identifier, wherein the text features are extracted from voice data in the video data of a user;
    determining, by the multimodal assisting system, autocorrelation values among each of the plurality of visual features, the plurality of voice features, and the plurality of text features;
    aligning, by the multimodal assisting system, each of the plurality of visual features, the plurality of voice features and the plurality of text features based on the video segment identifier and the autocorrelation values to obtain a plurality of aligned multimodal features;
    determining, by the multimodal assisting system, one of two classes of emotions for each of the plurality of aligned multimodal features based on correlation values determined for each of the plurality of aligned multimodal features, wherein the two classes of emotions comprise positive class of emotions, and negative class of emotions;
    comparing, by the multimodal assisting system, the determined emotion for each of the plurality of aligned multimodal features with historic multimodal features from a database; and
    determining, by the multimodal assisting system, emotion of the user at real time based on comparison.

2. The method as claimed in claim 1, wherein aligning of each of the plurality of visual features, the plurality of voice features and the plurality of text features further comprises of:
    reducing, by the multimodal assisting system, size of the plurality of aligned multimodal features using a Principal Component Analysis (PCA) technique.

3. The method as claimed in claim 1, wherein the visual features comprise at least one of facial landmarks and pixel values used to obtain head pose estimation, facial action units and eye-gaze estimation.

4. The method as claimed in claim 1, wherein the voice features comprise at least one of frame energy, frame intensity/loudness, critical band spectra, Perceptual Linear Predictive (PLP) coefficients, Linear Predictive Coefficients (LPC) and Line Spectral Pairs.

5. The method as claimed in claim 1, wherein the positive class of emotions further comprise of happy, interest, excitement, love and contentment, and
    wherein the negative class of emotions further comprise of sad, anger, fear, disgust and contempt.

6. The method as claimed in claim 1, wherein determining emotion of the user further comprising:
    detecting, by the multimodal assisting system, at least one of neuro-psychological disorder and facial emotion recognition deficits (FERD) symptoms in the user.

7. The method as claimed in claim 1, further comprising:
    monitoring, by the multimodal assisting system, the emotion of the user at real time for analysing the determined emotion of the user; and
    updating, by the multimodal assisting system, the historic multimodal features in the database based on the analysis.

8. A real time multimodal assisting system for multimodal analysis for emotion recognition, the system comprising:
    a processor; and
    a memory communicatively coupled to the processor, wherein the memory stores processor-executable instructions, which on execution, cause the processor to:
        segment video data of a user into a plurality of video segments, wherein each of the plurality of video segments are identified by a video segment identifier;
        extract a plurality of visual features, a plurality of voice features and a plurality of text features from the plurality of video segments, wherein the plurality of visual features, the plurality of voice features, and the plurality of text features are identified by the corresponding video segment identifier, wherein the text features are extracted from voice data in the video data of a user;

determine autocorrelation values among each of the plurality of visual features, the plurality of voice features, and the plurality of text features;

align each of the plurality of visual features, the plurality of voice features and the plurality of text features based on the video segment identifier and the autocorrelation values to obtain a plurality of aligned multimodal features;

determine one of two classes of emotions for each of the plurality of aligned multimodal features based on correlation values determined for each of the plurality of aligned multimodal features, wherein the two classes of emotions comprise positive class of emotions, and negative class of emotions;

compare the determined emotion for each of the plurality of aligned multimodal features with historic multimodal features from a database; and determine emotion of the user at real time based on comparison.

9. The multimodal assisting system as claimed in claim 8, the multimodal assisting system causes the processor to:

reduce size of the plurality of aligned multimodal features using a Principal Component Analysis (PCA) technique.

10. The multimodal assisting system as claimed in claim 8, wherein the visual features comprise at least one of facial landmarks and pixel values used to obtain head pose estimation, facial action units and eye-gaze estimation.

11. The multimodal assisting system as claimed in claim 8, wherein the voice features comprise at least one of frame energy, frame intensity/loudness, critical band spectra, Perceptual Linear Predictive (PLP) coefficients, Linear Predictive Coefficients (LPC) and Line Spectral Pairs.

12. The multimodal assisting system as claimed in claim 8, wherein the positive class of emotions further comprise of happy, interest, excitement, love and contentment, and wherein the negative class of emotions further comprise of sad, anger, fear, disgust and contempt.

13. The multimodal assisting system as claimed in claim 8, the multimodal assisting system further causes the processor to:

detect at least one of neuro-psychological disorder and facial emotion recognition deficits (FERD) symptoms in the user.

14. The multimodal assisting system as claimed in claim 8, the multimodal assisting system causes the processor to:

monitor the emotion of the user at real time for analysing the determined emotion of the user; and update the historic multimodal features in the database based on the analysis.

15. A non-transitory computer readable medium including instructions stored thereon that when processed by at least one processor cause a multimodal assisting system to perform operations comprising:

segmenting video data of a user into a plurality of video segments, wherein each of the plurality of video segments are identified by a video segment identifier;

extracting a plurality of visual features, a plurality of voice features and a plurality of text features from the plurality of video segments, wherein the plurality of visual features, the plurality of voice features, and the plurality of text features are identified by the corresponding video segment identifier, wherein the text features are extracted from voice data in the video data of a user;

determining autocorrelation values among each of the plurality of visual features, the plurality of voice features, and the plurality of text features;

aligning each of the plurality of visual features, the plurality of voice features and the plurality of text features based on the video segment identifier and the autocorrelation values to obtain a plurality of aligned multimodal features;

determining one of two classes of emotions for each of the plurality of aligned multimodal features based on correlation values determined for each of the plurality of aligned multimodal features, wherein the two classes of emotions comprise positive class of emotions, and negative class of emotions;

comparing the determined emotion for each of the plurality of aligned multimodal features with historic multimodal features from a database; and determining emotion of the user at real time based on comparison.

16. The medium as claimed in claim 15, wherein the instruction causes the processor to:

reduce size of the plurality of aligned multimodal features using a Principal Component Analysis (PCA) technique.

17. The medium as claimed in claim 15, wherein the visual features comprise at least one of facial landmarks and pixel values used to obtain head pose estimation, facial action units and eye-gaze estimation.

18. The medium as claimed in claim 15, wherein the voice features comprise at least one of frame energy, frame intensity/loudness, critical band spectra, Perceptual Linear Predictive (PLP) coefficients, Linear Predictive Coefficients (LPC) and Line Spectral Pairs.

19. The medium as claimed in claim 15, wherein the instruction causes the processor to:

detect at least one of neuro-psychological disorder and facial emotion recognition deficits (FERD) symptoms in the user.

20. The medium as claimed in claim 15, wherein the instruction causes the processor to:

monitor the emotion of the user at real time for analysing the determined emotion of the user; and update the historic multimodal features in the database based on the analysis.

* * * * *